US008967700B2

(12) United States Patent
Slaats et al.

(10) Patent No.: US 8,967,700 B2
(45) Date of Patent: Mar. 3, 2015

(54) MOTOR VEHICLES HAVING BUMPER COUNTER ROTATION BRACKETS

(71) Applicants: Toyota Motor Engineering & Manufacturing North America, Inc., Erlanger, KY (US); Toyota Motor Corporation, Toyota (JP)

(72) Inventors: Paul Maria-Antonius Slaats, Ann Arbor, MI (US); Kanichi Saito, Ann Arbor, MI (US); Paxton Steven Williams, Milan, MI (US); Joseph Charles Walusek, Ann Arbor, MI (US); Sagar Vilas Kulkarni, Troy, MI (US)

(73) Assignees: Toyota Motor Engineering & Manufacturing North America, Inc., Erlanger, KY (US); Toyota Motor Corporation (JP)

( * ) Notice: Subject to any disclaimer, the term of this patent is extended or adjusted under 35 U.S.C. 154(b) by 0 days.

(21) Appl. No.: 13/786,590

(22) Filed: Mar. 6, 2013

(65) Prior Publication Data
US 2014/0077510 A1 Mar. 20, 2014

Related U.S. Application Data

(63) Continuation of application No. 13/296,701, filed on Nov. 15, 2011, now Pat. No. 8,408,636.

(51) Int. Cl.
*B60R 19/34* (2006.01)
*B60R 19/02* (2006.01)
(Continued)

(52) U.S. Cl.
CPC ............ *B60R 19/023* (2013.01); *B62D 21/152* (2013.01); *B60R 19/12* (2013.01)
USPC .................................... 296/187.09; 293/133

(58) Field of Classification Search
USPC ........ 296/187.09, 203.02; 293/102, 120, 143, 293/144, 148, 142, 122, 115, 133; 180/274; 280/784
See application file for complete search history.

(56) References Cited

U.S. PATENT DOCUMENTS

| 4,328,986 A | 5/1982 | Weller et al. |
| 4,460,205 A | 7/1984 | Glance |

(Continued)

FOREIGN PATENT DOCUMENTS

| JP | H11171048 | 6/1999 |
| JP | 2000289646 | 10/2000 |

(Continued)

OTHER PUBLICATIONS

Japan Institute of Invention and Innovation Journal of Technical Disclosure; 2009-501276.

*Primary Examiner* — Joseph D Pape
(74) *Attorney, Agent, or Firm* — Dinsmore & Shohl LLP

(57) ABSTRACT

A motor vehicle includes a first side member having first lower and upper darts. The motor vehicle also includes a second side member parallel with and spaced apart from the first side member, the second side member having second lower and upper darts. The upper darts are positioned between the lower darts and end portions of the respective first or second side members. The motor vehicle further includes first and second bumper brackets coupled to the end portion of the respective first or second side members, a bumper reinforcement member coupled to the first and second bumper brackets, and a counter rotation bracket coupled to the bumper reinforcement member and extending upwards from the bumper reinforcement member. The lower darts and the upper darts form a preferential buckling zone of the first and the second side members.

20 Claims, 4 Drawing Sheets

(51) Int. Cl.
*B62D 21/15* (2006.01)
*B60R 19/12* (2006.01)

(56) References Cited

U.S. PATENT DOCUMENTS

| | | |
|---|---|---|
| 5,201,912 A | 4/1993 | Terada et al. |
| 6,059,331 A | 5/2000 | Mori |
| 6,142,542 A | 11/2000 | Sherno |
| 6,554,176 B2 | 4/2003 | McGill |
| 6,663,151 B2 | 12/2003 | Mansoor et al. |
| 7,677,617 B2 * | 3/2010 | Stewart et al. ........ 293/133 |
| 7,954,866 B2 | 6/2011 | Barcomb et al. |
| 2009/0315346 A1 | 12/2009 | Schelberg et al. |
| 2010/0001540 A1 | 1/2010 | Barcomb et al. |
| 2010/0244471 A1 | 9/2010 | Wiedermann et al. |
| 2010/0253103 A1 | 10/2010 | Wiedermann et al. |

FOREIGN PATENT DOCUMENTS

| | | |
|---|---|---|
| JP | 2006076504 | 3/2006 |
| JP | 2006088886 | 4/2006 |
| JP | 2009137523 | 6/2009 |

* cited by examiner

MOTOR VEHICLES HAVING BUMPER COUNTER ROTATION BRACKETS

CROSS-REFERENCE TO RELATED APPLICATIONS

This application is a continuation of U.S. patent application Ser. No. 13/296,701 filed Nov. 15, 2011.

TECHNICAL FIELD

The present disclosure is generally directed to motor vehicles having bumper counter rotation brackets, and is specifically directed to bumper counter rotation brackets that apply moment loads to the structure of the motor vehicles.

BACKGROUND

Motor vehicles are required to maintain structural integrity of vehicle subsystems in the event of a collision with another vehicle or stationary object. In order to dissipate energy associated with a collision, vehicles include bumpers that absorb energy by resisting impact and/or deforming to prevent a colliding vehicle from damaging the vehicle subsystems.

As the speed at which a collision takes places increases, the energy required to be dissipated by the bumper of the vehicle increases. The requirement to dissipate increased energy may be complicated by uneven bumper heights of the colliding vehicles. Because the bumpers of the colliding vehicles do not contact one another evenly, the energy dissipation systems of the vehicles may not activate in the event of a collision, which may lead to damage to vehicle subsystems.

Accordingly, alternative systems and methods for dissipating the energy of a vehicle collision are needed.

SUMMARY

In one embodiment, a motor vehicle includes a first side member having a first lower dart and a first upper dart, where the first upper dart is positioned between the first lower dart and an end portion of the first side member. The motor vehicle also includes a second side member parallel with and spaced apart from the first side member, the second side member having a second lower dart and a second upper dart, where the second upper dart is positioned between the second lower dart and an end portion of the second side member. The motor vehicle further includes a first bumper bracket coupled to the end portion of the first side member, a second bumper bracket coupled to the end portion of the second side member, a bumper reinforcement member coupled to the first and second bumper brackets, and a counter rotation bracket coupled to the bumper reinforcement member and extending upwards from the bumper reinforcement member. The lower darts and the upper darts form a preferential buckling zone of the first and the second side members.

In another embodiment, an impact energy dissipation system for a vehicle structure including a first bumper bracket and a second bumper bracket coupling the system to the vehicle structure, a bumper reinforcement member coupled to the first and second bumper brackets and having a bumper height, and a counter rotation bracket coupled to and extending upwards from the bumper reinforcement member, where the counter rotation bracket has a bracket height that is at least approximately 50% of the bumper height.

In yet another embodiment, a motor vehicle includes a first side member having a first lower dart and a first upper dart, where the first upper dart is positioned rearward of the first lower dart. The motor vehicle also includes a second side member parallel with and spaced apart from the first side member, the second side member having a second lower dart and a second upper dart, where the second upper dart is positioned rearward of the second lower dart. The motor vehicle further includes a first bumper bracket coupled to the end portion of the first side member, a second bumper bracket coupled to the end portion of the second side member, a first gusset coupled to the first side member and the first bumper bracket, and a second gusset coupled to the second side member and the second bumper bracket. The motor vehicle also includes a bumper reinforcement member coupled to the first and second bumper brackets, and a counter rotation bracket coupled to the bumper reinforcement member and extending upwards from the bumper reinforcement member, where the lower darts and the upper darts form a preferential buckling zone of the first and the second side members.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
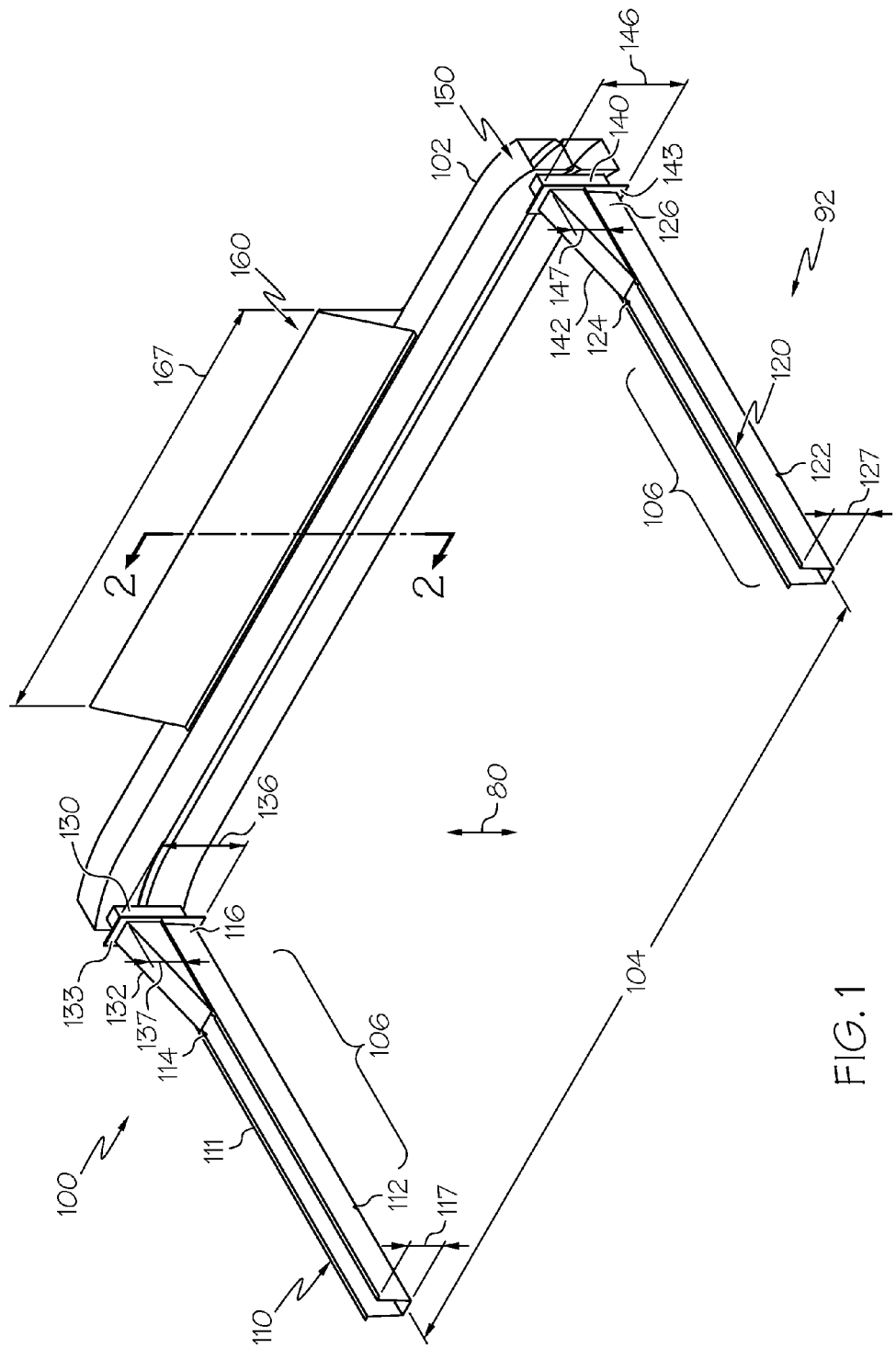
FIG. 1 depicts a perspective view of an impact energy dissipation system for a motor vehicle including a counter rotation bracket according to one or more embodiments shown and described herein.

Referring to FIG. 1, an impact energy dissipation system for a vehicle structure is schematically depicted. The impact energy dissipation system generally includes first and second side members, first and second bumper brackets, a bumper reinforcement member, and a counter rotation bracket. The first and second side members each include a lower dart and an upper dart, where the upper darts are positioned between the lower darts and the end portions of the side members. The lower darts and the upper darts form a preferential buckling zone of the first and the second side members. The impact energy dissipation system further includes first and second bumper brackets coupled to the end portions of the respective side members, a bumper reinforcement member coupled to the bumper brackets, and a counter rotation bracket coupled to the bumper reinforcement member and extending upwards from the bumper reinforcement member. In the event of a collision with an incoming vehicle, the counter rotation bracket and the bumper reinforcement member contact the incoming vehicle, and may apply a moment load that tends to buckle the side members at the preferential buckling zone.

The impact energy dissipation system and vehicles incorporating the same will be described in more detail herein with specific reference to the appended drawings.

Referring to FIG. 1, one embodiment of a motor vehicle 90 including an impact energy dissipation system 100 is schematically depicted. The vehicle structure 92 of the motor vehicle 90 includes a first side member 110 that includes a first lower dart 112 and a first upper dart 114, where the first upper dart 114 is positioned between the first lower dart 112 and an end portion 116 of the first side member 110. Similarly, vehicle structure 92 of the motor vehicle 90 includes a second side member 120 that includes a second lower dart 122 and a second upper dart 124, where the second upper dart 124 is positioned between the second lower dart 122 and an end portion 126 of the second side member 120. The impact energy dissipation system 100 of the motor vehicle 90 includes a first bumper bracket 130 coupled to the first side member 110 and a second bumper bracket 140 coupled to the second side member 120. The impact energy dissipation system 100 further includes a bumper reinforcement member 150 coupled to the first and second bumper brackets 130, 140, and a counter rotation bracket 160 coupled to the bumper reinforcement member 150 and extending upwards from the bumper reinforcement member 150.

Figure 3:
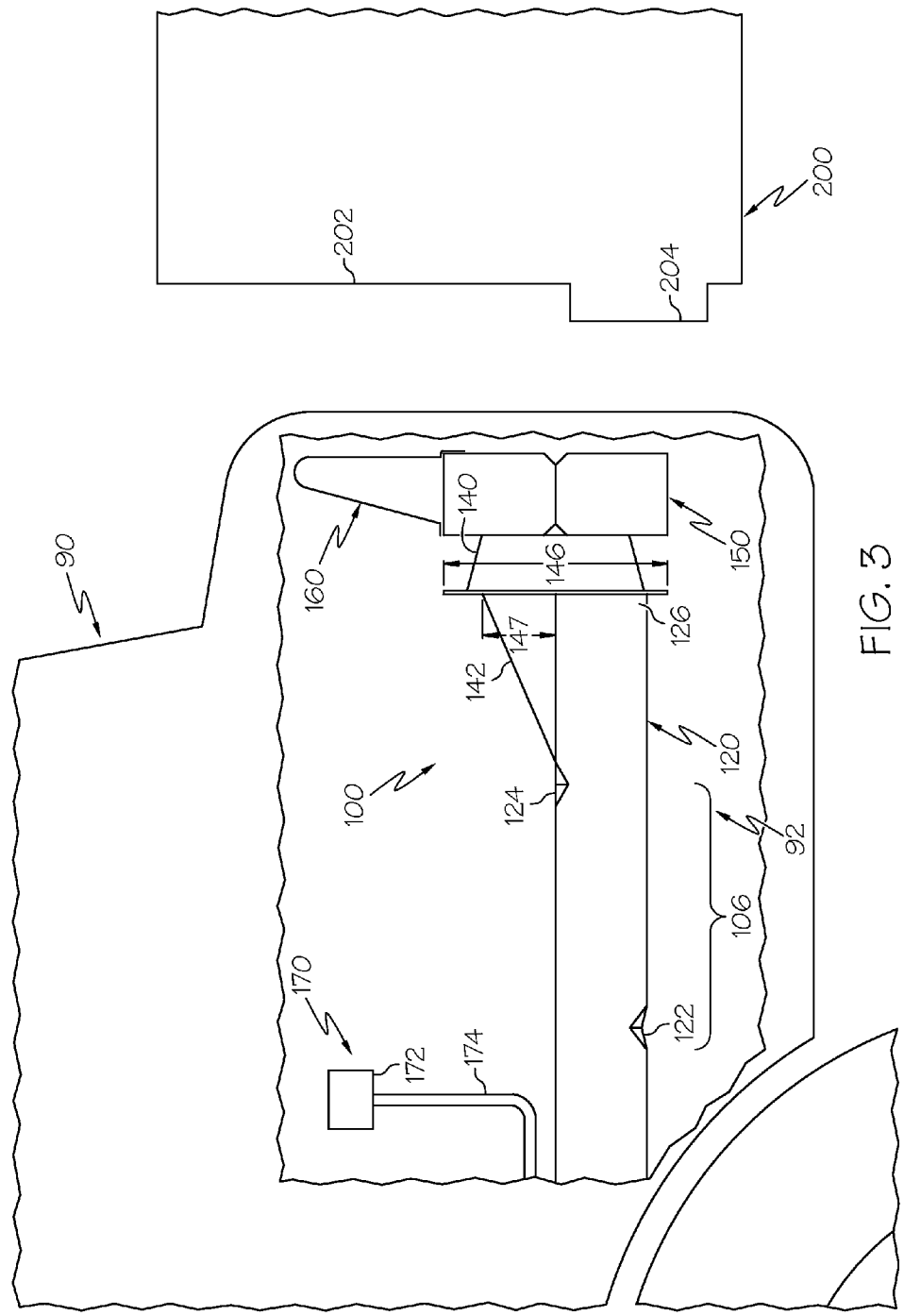
FIG. 3 depicts a side view of a motor vehicle including a counter rotation bracket in an undeformed state according to one or more embodiments shown and described herein.
Figure 4:
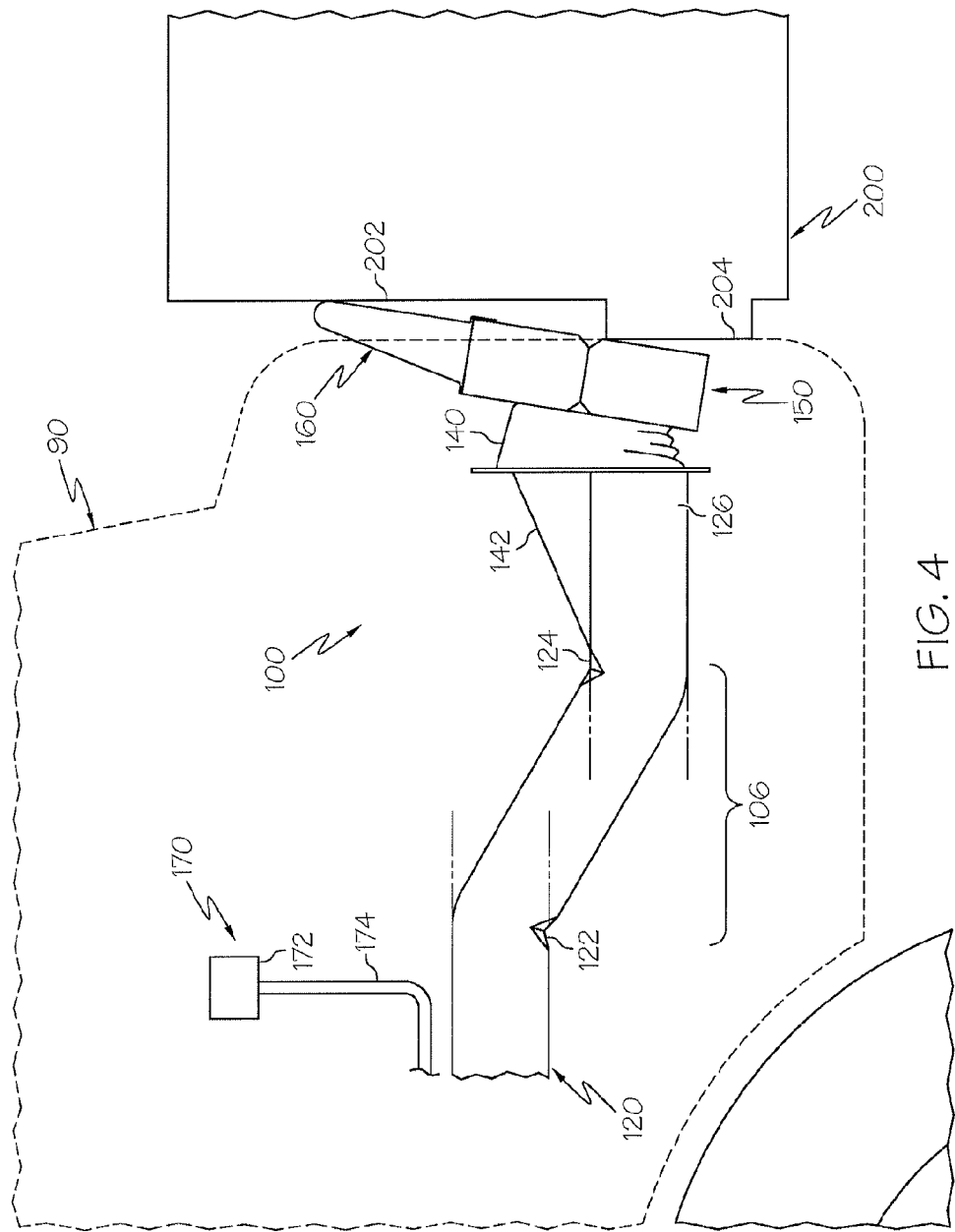
FIG. 4 depicts a side view of a motor vehicle including a counter rotation bracket in a deformed state according to one or more embodiments shown and described herein.

The first and second lower darts 112, 122 and the first and second upper darts 114, 124 form a preferential buckling zone 106 of the first and second side members 110, 120. The lower darts 112, 122 and the upper darts 114, 124 are local regions of the respective first and second side members 110, 120 that decrease the buckling strength of the first and second side members 110, 120. As used herein, "buckling strength" refers to the maximum compressive strength an element can withstand before failing, where the compressive stress at the location of the failure is less than the compressive stresses the material of the element is capable of withstanding. The buckling strength of an element can be determined experimentally or approximated using analysis, for example, finite element analysis. The darts 112, 122, 114, 124 may take a variety of shapes, including having a chevron-like shape as illustrated in FIGS. 3 and 4. The darts 112, 122, 114, 124 can be locally deformed regions of the first and second side members 110, 120 that interrupt the otherwise continuous first and second side members 110, 120. The darts 112, 122, 114, 124 reduce the buckling strength of the first and second side members 110, 120 such that, when the first and second side members 110, 120 are subject to an impact force directed along the length of the side member 110, 120, the first and second side members 110, 120 tend to "close" the darts 112, 122, 114, 124, encouraging controlled deformation of the first and second side members 110, 120.

As illustrated in FIG. 1, in some embodiments, the impact energy dissipation system 100 of the motor vehicle 90 further includes a first gusset 132 coupled to the first side member 110 and the first bumper bracket 130, and a second gusset 142 coupled to the second side member 120 and the second bumper bracket 140. The first and second gussets 132, 142 may be located on the top surface 111, 121 of the respective first side member 110 and the second side member 120. The first and second gussets 132, 142 are located between the upper darts 114, 124 and the end portions 116, 126 of the first and second side members 110, 120. The first and second gussets 132, 142 provide reinforcement between the respective side member 110, 120 and the bumper bracket 130, 140. The first and second gussets 132, 142 are adapted to absorb force and moment applied to the bumper brackets 130, 140 and direct any such force and moment into the respective side member 110, 120. Additionally, the first and second gussets 132, 142 may terminate before the first and second upper darts 114, 124 of the first and second side members 110, 120 and concentrate any moment into the side members 110, 120 in regions local to the upper darts 114, 124.

As discussed herein, the bumper reinforcement member 150 and the counter rotation bracket 160 may be located towards a front of the motor vehicle 90, such that the bumper reinforcement member 150 forms a front vehicle bumper; or the bumper reinforcement member 150 and the counter rotation bracket 160 may be located towards a rear of the motor vehicle 90, such that the bumper reinforcement member 150 forms a rear vehicle bumper. Discussion of the motor vehicle 90 below is made in reference to the bumper reinforcement member 150 and the counter rotation bracket 160 located towards a rear of the motor vehicle 90. As depicted in FIG. 1, a forward-facing surface 133 of the first bumper bracket 130 is oriented to face towards the first side member 110 and the first gusset 132. A forward-facing surface 143 of the second bumper bracket 140 is oriented to face towards the second side member 120 and the second gusset 142.

Figure 2:
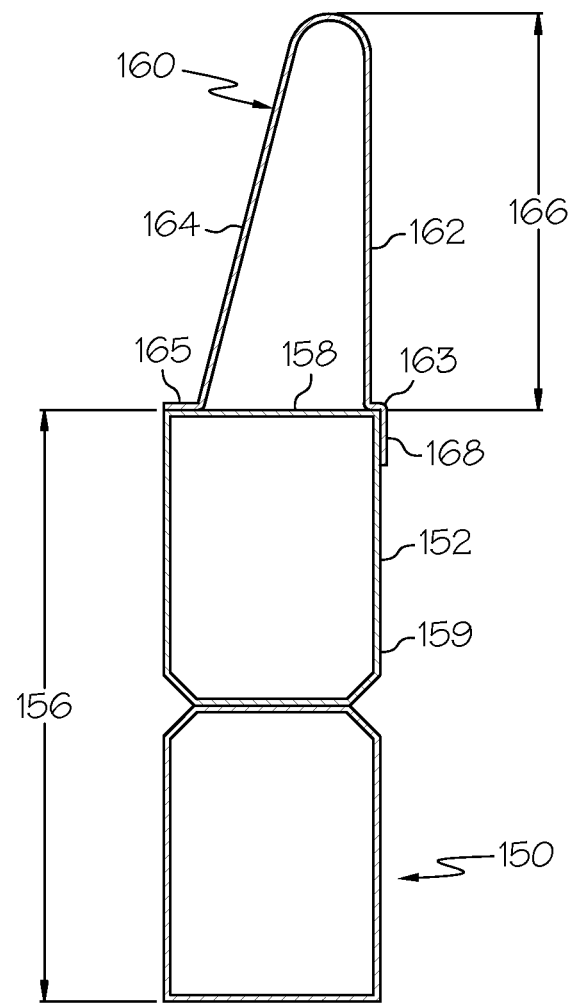
FIG. 2 depicts a side view of a portion of the impact energy dissipation system for a motor vehicle of FIG. 1 along line 2-2.

Referring now to FIG. 2, the counter rotation bracket 160 and the bumper reinforcement member 150 are illustrated in cross-section. The counter rotation bracket 160 extends upwards from the bumper reinforcement member 150. The counter rotation bracket 160 includes a contact portion 162 and a reinforcement portion 164. The contact portion 162 is approximately parallel with a face of the bumper reinforcement member 150, shown here approximately parallel to the rearward-facing surface 152. As depicted in FIG. 2, the reinforcement portion 164 is transverse to the contact portion 152. The contact portion 162 of the counter rotation bracket 160 is coupled to the bumper reinforcement member 150 at a contact flange 163, while the reinforcement portion 164 of the counter rotation bracket 160 is coupled to the bumper reinforcement member 150 at a support flange 165. As depicted in FIG. 2, the contact flange 163 may define a lip 168 that is generally parallel to and offset rearwardly from the contact portion 162 of the counter rotation bracket 160. The lip may be positioned along the bumper reinforcement member 150 such that the contact flange 163 of the counter rotation bracket 160 overlaps both a portion of a top surface 158 of the bumper reinforcement member 150 and a portion of a rearward surface 159 of the bumper reinforcement member 150. The support flange 165 of the counter rotation bracket 165 may be transverse to the reinforcement portion 164 of the counter rotation bracket 160. The support flange 165 may be coupled to the top surface 158 of the bumper reinforcement member 150. A variety of attachment methods are contemplated including, but not limited to, structural spot welding, welding, riveting, bolting, or adhesively bonding along the contact flange 163 and/or the support flange 165.

Referring to FIGS. 1 and 2, the counter rotation bracket 160 is sized and positioned to provide increased protection to the motor vehicle 90 while allowing the counter rotation bracket 160 to be packaged within the bodywork of the motor vehicle 90, including the bumper cover (not shown). The counter rotation bracket 160 extends a bracket width 167 that is at least approximately ⅓ of a distance 104 between the first side member 110 and the second side member 120. The counter rotation bracket 160 also has a bracket height 166 that is at least approximately 50% of a bumper height 156 of the bumper reinforcement member 150. Further, the first bumper bracket 130 has a first bumper bracket height 136 and the second bumper bracket 140 has a second bumper bracket height 146. The first side member 110 has a first side member height 117 and the second side member 120 has a second side member height 127 as evaluated in a vertical direction 80. As depicted in FIGS. 1 and 3, the first bumper bracket height 136 may be greater than the first side member height 117 and the second bumper bracket height 146 may be greater than the second side member height 127. The first gusset 132 may have a first gusset height 137 and the second gusset 142 may have a second gusset height 147. As further depicted in FIGS. 1 and 3, the first bumper bracket height 136 may be greater than the first gusset height 137 and the second bumper bracket height 146 may be greater than the second gusset height 147.

Components of the motor vehicle 90 may be made from a variety of materials having appropriate material properties, including strength, modulus, impact resistance, and fracture toughness, for the application. The first and second side members 110, 120 may be made of a galvanized steel, for example, SCGA 570D. In one embodiment, the first and second side members 110, 120 may include a "top hat" design, where each of the first and second side members 110, 120 are a weldment formed by an inside and an outside portion of the first and second side members 110, 120. The first and second bumper brackets 130, 140 may be made of a galvanized steel, for example SCGA 270D, and may be deep-drawn from sheet stock to the required shape. The bumper reinforcement member 150 may be made of an aluminum alloy and may be formed using an extrusion process. The counter rotation bracket 160 may be made of an aluminum alloy or a corrosion resistant steel and may be formed using an extrusion process. The first and second gussets 132, 142 may be made of a corrosion resistant steel, for example 440 stainless, and may be drawn from sheet stock to the required shape.

Referring now to FIGS. 3 and 4, a motor vehicle 90 including a counter rotation bracket 160 is illustrated before and after a collision with a barrier 200. A first, undeformed orientation of the motor vehicle 90 is illustrated in FIG. 3, while a second, deformed orientation of the motor vehicle 90 is illustrated in FIG. 4. The counter rotation bracket 160 of the motor vehicle 90 depicted in FIGS. 3 and 4 is located towards a rear of the motor vehicle 90, and the collision with the barrier 200 represents a rear collision with the motor vehicle 90. Sensitive subsystems of the motor vehicle 90, for example, a vehicle fueling system 170, which includes a fuel filler inlet 172, a fuel filler neck 174, and a fuel tank (not shown), are located forward of the bumper reinforcement member 150, and forward of the second lower and upper darts 122, 124, such that the components of the vehicle fueling system 170 are located forward of the preferential buckling zone 106. While discussion of FIGS. 3 and 4 is made in reference to the second side member 120, the second lower and upper darts 122, 124, and the second bumper bracket 140, it should be understood that during a collision, similar phenomena occur with regard to the first side member 110, the first lower and upper darts 112, 114, and the first bumper bracket 130.

Referring to FIG. 4, as the motor vehicle 90 impacts the barrier 200, the bumper portion 204 of the barrier first contacts the bumper reinforcement member 150. This impact initially causes the bumper reinforcement member 150 to translate towards the end portion 126 of the second side member 120 by deforming the second bumper bracket 140. The impact causes the second bumper bracket 140 to buckle, which causes the bumper reinforcement member 150 and the counter rotation bracket 160 to pivot about the second bumper bracket 140 such that the counter rotation bracket 160 pitches towards the fascia portion 202 of the barrier 200. As the bumper reinforcement member 150 contacts the bumper portion 204 of the barrier 200 and the counter rotation bracket 160 contacts the fascia portion 202 of the barrier 200, the continued application of force due to the impact of the barrier 200 with the motor vehicle 90 causes a counter-moment to be applied through the counter rotation bracket 160 into the second side member 120. The counter-moment is applied to the second side member 120 in a direction that tends to "close" the second upper dart 124. Additionally, because the second gusset 142 is attached to the second side member 120 and is located between the second upper dart 124 and the end portion 126, the second gusset 142 tends to direct the counter-moment into a region of the second side member 120 immediately surrounding the second upper dart 124.

With the bumper reinforcement member 150 contacting the bumper portion 204 of the barrier 200, the counter rotation bracket 160 contacting the fascia portion 202 of the barrier 200, and the second side member 120 at least partially deformed about the second upper dart 124, the continued application of force due to the impact of the barrier 200 with the motor vehicle 90 causes a moment to be applied to the second side member 120 in a direction that tends to "close" the second lower dart 122.

The second bumper bracket 140 has a bumper bracket buckling strength, and the second side member 120 has a side member buckling strength which is evaluated at the second upper dart 124. In the embodiment of the motor vehicle 90 depicted in FIGS. 3 and 4, the second bumper bracket 140 and the second side member 120 are designed such that the bumper bracket buckling strength is less than the side member buckling strength. Because the bumper bracket buckling strength is less than the side member buckling strength, the second bumper bracket 140 will reach a critical buckling load at a lower force than the second side member 120 will reach a critical buckling load. Because the second bumper bracket 140 reaches its critical buckling load first, the second bumper bracket 140 will buckle and deform before the second side member 120, which allows the bumper reinforcement member 150 and the counter rotation bracket 160 to pitch forward to contact the barrier 200. Therefore, by buckling the second bumper bracket 140 before the second side member 120, the counter rotation bracket 160 will be positioned to apply a counter-moment to the second side member 120.

Parameters of the barrier 200 and an impact between the motor vehicle 90 and the barrier 200 are found in Federal Motor Vehicle Safety Standard (FMVSS) No. 301. FMVSS No. 301 requires a motor vehicle 90 to maintain integrity of the vehicle fueling system 170 after the motor vehicle 90 sustains an impact with a barrier 200 moving in excess of 80 kilometers per hour.

Without being bound by theory, as the bracket height 166 of the counter rotation bracket 160 increases, the greater the counter-moment that can be applied through the first and second bumper brackets to the first and second side members 110, 120. Therefore, the bracket height 166 of the counter rotation bracket 160 may be made as large as possible to increase the counter moment, while maintaining the ability to package the counter rotation bracket 160 within the confines of the bodywork of the motor vehicle 90. Similarly, as the bracket width 167 of the counter rotation bracket 160 increases, the counter rotation bracket 160 provides an increased zone of protection to motor vehicle 90 and its subsystems. Bracket width 167 may be limited by the ability to package the counter rotation bracket 160 within the confines of the bodywork of the motor vehicle 90.

It should now be understood that the buckling of the first and second side members 110, 120 and the first and second bumper brackets 130, 140 dissipates energy associated with the barrier 200 impacting the motor vehicle 90. The preferential buckling zone 106 formed by the lower darts 112, 122 and the upper darts 114, 124 allows the first and second side members 110, 120 to buckle at a location rearward of the vehicle fueling system 170. The buckling of the first and second side members 110, 120 prevents energy due to the collision of the barrier 200 with the motor vehicle 90 from traveling forward beyond the preferential buckling zone 106. By dissipating the energy caused by the collision rearward of the vehicle fueling system 170, damage to the vehicle fueling system 170 can be minimized.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A motor vehicle comprising:
   a first side member comprising a first lower dart and a first upper dart, wherein the first upper dart is positioned between the first lower dart and an end portion of the first side member;
   a second side member parallel with and spaced apart from the first side member, the second side member comprising a second lower dart and a second upper dart, wherein the second upper dart is positioned between the second lower dart and an end portion of the second side member;
   a first bumper bracket coupled to the end portion of the first side member;
   a second bumper bracket coupled to the end portion of the second side member;
   a first gusset coupled to the first side member and the first bumper bracket;
   a second gusset coupled to the second side member and the second bumper bracket;
   a bumper reinforcement member coupled to the first and second bumper brackets; and
   a counter rotation bracket coupled to the bumper reinforcement member and extending upwards from the bumper reinforcement member,
   wherein:
   the first gusset is located between the first upper dart and the end portion of the first side member;
   the second gusset is located between the second upper dart and the end portion of the second side member;
   the lower darts and the upper darts form a preferential buckling zone of the first and the second side members, and
   a bumper bracket buckling strength of the first and second bumper brackets is less than a side member buckling strength of the respective first and second side members.

2. The motor vehicle of claim 1, wherein the bumper reinforcement member is located towards a rear of the motor vehicle.

3. The motor vehicle of claim 1, wherein the bumper reinforcement member is located towards a front of the motor vehicle.

4. The motor vehicle of claim 1, wherein the preferential buckling zone of the first and second side members is rearward of a vehicle fueling system.

5. The motor vehicle of claim 1, wherein:
   the counter rotation bracket comprises a contact portion and a reinforcement portion;
   the contact portion is parallel with a rearward-facing surface of the bumper reinforcement member; and
   both the contact portion and the reinforcement portion are coupled to the bumper reinforcement member.

6. The motor vehicle of claim 1, wherein a bracket height of the counter rotation bracket is at least approximately 50% of a bumper height of the bumper reinforcement member.

7. The motor vehicle of claim 1, wherein the counter rotation bracket extends a bracket width that is at least approximately ⅓rd of a distance between the first side member and the second side member.

8. The motor vehicle of claim 1, wherein the buckling strength of the first side member and the second side member exhibit reduced buckling strength at the first lower dart and the second lower dart, respectively, such that the end portions of the first side member and the second side member tend to deform downwards when impacted.

9. The motor vehicle of claim 2, wherein:
   the first gusset is located on the top surface of the first side member;
   the second gusset is located on the top surface of the second side member; and
   the forward-facing surface of the first bumper bracket is oriented to face towards the first side member and first gusset and the forward-facing surface of the second bumper bracket is oriented to face towards the second side member and the second gusset.

10. The motor vehicle of claim 9, wherein a first bumper bracket height of the first bumper bracket and a second bumper bracket height of the second bumper bracket evaluated in a vertical direction is greater than a first side member height of the first side member and a second side member height of the second side member, respectively.

11. The motor vehicle of claim 9, wherein a first bumper bracket height of the first bumper bracket and a second bumper bracket height of the second bumper bracket evaluated in a vertical direction is greater than a first gusset height of the first gusset and a second gusset height of the second gusset, respectively.

12. The motor vehicle of claim 9, wherein the first gusset and the second gusset terminate at a position rearward of the first upper dart and the second upper dart, respectively.

13. The motor vehicle of claim 5, wherein the reinforcement portion of the counter rotation bracket is transverse to the contact portion of the counter rotation bracket.

14. The motor vehicle of claim 5, wherein:
   the counter rotation bracket further comprises a support flange; and
   the support flange is coupled to the reinforcement portion, transverse to the reinforcement portion, and coupled to a top surface of the bumper reinforcement member.

15. The motor vehicle of claim 5, wherein:
   the bumper reinforcement member is located towards a rear of the motor vehicle;
   the counter rotation bracket further comprises a contact flange; and
   the contact flange is coupled to the contact portion and overlaps a portion of top surface of the bumper reinforcement member and a portion of the rearward surface of the bumper reinforcement member.

16. The motor vehicle of claim 15, wherein the contact flange comprises a lip that is generally parallel to and offset rearwardly from the contact portion of the counter rotation bracket.

17. A motor vehicle comprising:
- a first side member comprising a first lower dart and a first upper dart, wherein the first upper dart is positioned between the first lower dart and an end portion of the first side member;
- a second side member parallel with and spaced apart from the first side member, the second side member comprising a second lower dart and a second upper dart, wherein the second upper dart is positioned between the second lower dart and an end portion of the second side member;
- a first bumper bracket coupled to the end portion of the first side member;
- a second bumper bracket coupled to the end portion of the second side member;
- a bumper reinforcement member coupled to the first and second bumper brackets; and
- a counter rotation bracket coupled to the bumper reinforcement member and extending upwards from the bumper reinforcement member, wherein:
- the lower darts and the upper darts form a preferential buckling zone of the first and the second side members;
- a bumper bracket buckling strength of the first and second bumper brackets is less than a side member buckling strength of the respective first and second side members; and
- the first and second side members exhibit reduced buckling strength at the first lower dart and the second lower dart, respectively, such that the end portions of the first and second side members tend to deform downwards when impacted.

18. The motor vehicle of claim 17, wherein the bumper reinforcement member is located towards a rear of the motor vehicle.

19. The motor vehicle of claim 17, further comprising:
- a first gusset coupled to the first side member and the first bumper bracket; and
- a second gusset coupled to the second side member and the second bumper bracket.

20. The motor vehicle of claim 17, wherein:
- the counter rotation bracket comprises a contact portion and a reinforcement portion;
- the contact portion is parallel with a rearward-facing surface of the bumper reinforcement member; and
- both the contact portion and the reinforcement portion are coupled to the bumper reinforcement member.

* * * * *